Dec. 11, 1962 C. D. GIBSON 3,067,839
MATERIAL HANDLING VEHICLE
Filed March 29, 1961 3 Sheets-Sheet 1

CHRISTIAN D. GIBSON
INVENTOR

BY *Richard D. Stephens*
ATTORNEY

Dec. 11, 1962 C. D. GIBSON 3,067,839
MATERIAL HANDLING VEHICLE
Filed March 29, 1961 3 Sheets-Sheet 2

CHRISTIAN D. GIBSON
INVENTOR

BY Richard G. Stephens
ATTORNEY

United States Patent Office 3,067,839
Patented Dec. 11, 1962

3,067,839
MATERIAL HANDLING VEHICLE
Christian D. Gibson, Greene, N.Y., assignor to The Raymond Corporation, Greene, N.Y., a corporation of New York
Filed Mar. 29, 1961, Ser. No. 99,133
7 Claims. (Cl. 187—9)

This invention relates to improved material handling apparatus, and more particularly to an improved material handling truck which, by means of a simple adjustment effected by the operator, may be converted to drive principally and selectively in either one of two mutually perpendicular directions. Such a truck may be transported lengthwise along an aisle of a warehouse by driving the truck in one of its principal directions, i.e., either forward or sidewise, and then by performing the mentioned adjustment while the truck is stopped, the truck may be converted into one that can be driven principally in the other direction transverse to the first direction. A material handling truck of this general type is described in detail in my prior Patent No. 2,925,887, issued Feb. 23, 1960, to which the present invention in many respects is an improvement. Trucks of the type shown in my prior patent are marketed under the trademark "4–D" by the assignee of the present invention. While such trucks have gained widespread acceptance and have overcome many "narrow-aisle" material handling problems, certain advantages of the present invention are highly desirable for certain applications.

For many important material handling operations, including the handling of heavy objects on shipboard, where pitching and rolling frequently occurs, it is mandatory that a lift truck have maximum possible tractive and braking capabilities. It is further desirable that both fraction and braking forces on the vehicle be symmetric about the vehicle turning axis, so that application of tractive force or braking force does not cause the truck to tend to turn, as sometimes happens when the trucks of Pat. No. 2,925,887 are braked very hard. It is also desirable that any truck wheel follow or "track" closely the path determined by the position of the truck steering gear.

The present invention generally described, comprises a four-wheeled truck having its wheels located substantially at the corners of a rectangle, with a first wheel being a free-swiveling caster and a second wheel located diagonally opposite, the second wheel being adjustable through 90 degrees to discrete first and second directions, longitudinally and laterally with respect to the vehicle. The third and fourth wheels, located diagonally from each other, are adjustable to longitudinal and lateral reference positions, and made steerable in either direction from either reference position. The third and fourth wheels, in most embodiments of the invention, are driven by the truck tractive motor means and provided with braking means. It is possible, however, within the scope of the invention, to apply braking power and motive power to any one or more of the second, third and fourth wheels, either together with braking, or with braking being provided to different wheels than motive power, but without either motive power or braking being provided on the free-swiveling caster first wheel, of course.

The wheel configuration disclosed is believed to give the best conbination of carrying capacity, traction, braking and steering consistent with usual space limitations and simple steering geometry. The steering system does not require complex linkage or gearing arrangements in order to avoid tire scrubbing.

Thus it is a primary object of the invention to provide an improved "narrow-aisle" truck of the type described having extreme maneuverability but having considerably increased tractive and braking ability.

It is a further object of the present invention to provide a vehicle of the type described having improved tracking capabilities to facilitate vehicle steering, and moreover, to provide the same in a simplified arrangement requiring no complex steering linkages.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which.

Figure 1:
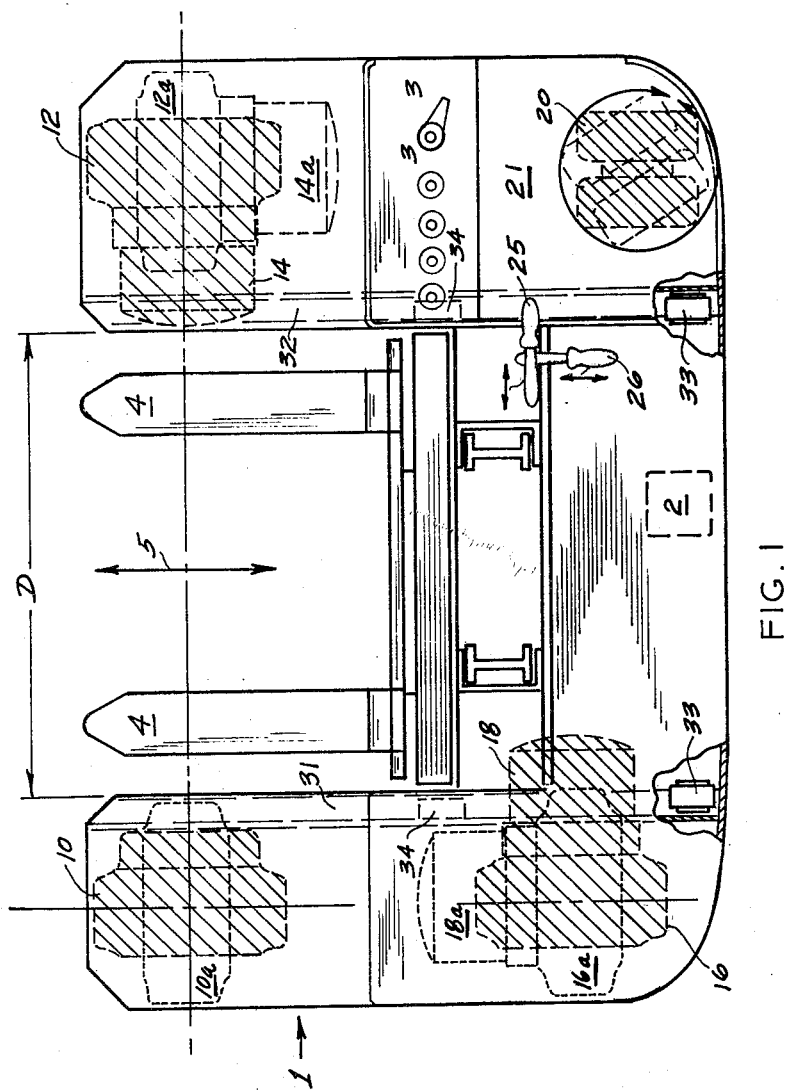
FIG. 1 is a plan view of an exemplary embodiment of the invention showing the wheel configuration of the invention, with various wheels of the invention shown in both their principally longitudinal position and their principally lateral position.

As shown in the figures, the truck is generally a U-shaped vehicle 1 with wheels near its four corners spaced at essentially the corners of a rectangle. Retraction of the load forks into the U-shaped frame allows provision of a truck of minimum length coupled with maximum stability, and greatly facilitates use of the truck in narrow aisles. In most embodiments of the invention all operating power for the vehicle is supplied from a battery 2 carried upon the vehicle, with the battery connected by means of control switches 3, 3 to operate electric and electro-hydraulic apparatus. The present invention will find special advantage where extreme braking, traction and stability criteria are imposed, such as on shipboard. The truck is shown as comprising a self-propelled, self-loading vehicle which will accommodate a riding operator. The truck is capable of traveling backward and forward in any of four directions. Loads are handled by a pair of forks 4, 4 which extend to pick up and place the load (not shown) and which retract as shown for traveling. Translation of the forks in the direction shown by arrow 5, which is termed the "longitudinal" direction for convenience of explanation, may be accomplished within the scope of the invention by a system where the lifting mast (which may be telescopic) is bodily translated relative to the main body of the vehicle, or alternatively, by a known alternative arrangement whereby a scissors-type mechanism is used to extend and retract a fork-carrying frame to and from a lifting mast which does not translate horizontally with respect to the truck main body. The translatable mast system shown usually is preferred over the scissor method of applications where greatest range of travel or "reach" is needed, and for applications where considerably "off-center" loads must be handled. Hydraulic power arrangements for extending and retracting masts and reach mechanisms are well-known and form no part of the present invention. For details of suitable scissors-type reach mechanisms my prior Patents Nos. 2,752,058 and 2,973,878 may be consulted.

Two drive wheels 12 and 16 are provided at opposite corners of the vhicle, to give near symmetric lines of thrust for both longitudinal nominal travel and lateral nominal travel. Rear drive wheel 16 is shown as comprising a "motor-wheel" combination of a type disclosed in my prior copending application Ser. No. 34,982, filed June 9, 1960, and assigned to the same assignee as the present invention. Drive motor 18 is mounted concentric with wheel 16. Similarly, right front drive wheel 12 is shown as being powered by drive motor 14. The concentric motor-wheel assemblies also may use hydraulic and mechanical braking, as disclosed in my prior applications. It is extremely important to note that regardless of whether the truck is adjusted for principally longitudinal travel or for principally lateral travel, that driving wheels 12 and 16 are both substantially equal distances (to each other) from the vehicle centerline. This prevents a force couple from arising due to motive thrust or braking, as would occur if the driving wheels were at different lever arm distances from the truck center, and thereby provides a much more easily controlled truck.

The third wheel, shown at 10 in the left-hand outrigger diagonally across the rectangle from the caster, may be similar to drive wheels 12 and 16 except that in most embodiments it is not powered, although it is adjustably positioned. This wheel is positionable, preferably by means of a hydraulic ram, to either one of two discrete mutually perpendicular positions but not steered by either tiller 25 or tiller 26. It is provided with a brake. Wheel 20 shown at the right rear corner of the truck under the operator's platform 21 is a free-swiveling caster, preferably provided with dual wheels and articulated spring suspension in the manner shown in my previous Pat. No. 2,564,002, to provide adequate bearing surface and to accommodate minor irregularities in the floor surface.

In most embodiments of the invention, conventional hydraulic braking is applied to both drive wheels 12 and 16 and to steerable non-driving wheel 10, but not to caster 20. A "dead man" safety system of known type may be incorporated to apply all brakes if the operator takes his weight from operator platform 21.

Steering is accomplished preferably by a hydraulic powered system. Tiller type control levers 25 and 26 are provided for the operator, one for each principal direction of travel. Tiller 26 operates during "principally longitudinal" travel, and tiller 25 operates during "principally lateral" travel. The steering geometry of the truck is made very simple by use of the "rectangular" wheel configuration disclosed. In any direction of travel, it will be seen that one steerable wheel will be paired with the swivel caster 20. This arrangement eliminates any need for complex steering linkages. The arrangement clearly is easily adaptable to power steering and to power positioning of the wheels to change from principally longitudinal travel to principally lateral travel and vice versa. The details of suitable hydraulic ram arrangement useful for power-positioning wheels to either of two discrete mutually perpendicular positions are well-known and shown in exemplary form in my prior Pat. No. 2,925,887 and need not be repeated here..

Drive wheels 12 and 16, steerable non-driving wheel 10 and swivel caster 20 all are shown in FIG. 1 in their "principally longitudinal" position. Superimposed on FIG. 1, however, are showings of the three steerable wheels in the "principally lateral" position, at 12a, 16a and 10a.

Tracks 31, 32 extend longitudinally along both sides of the forks to accommodate rollers 33, 34, so that the mast, load carriage and forks all may be extended and retracted.

Figure 3B:
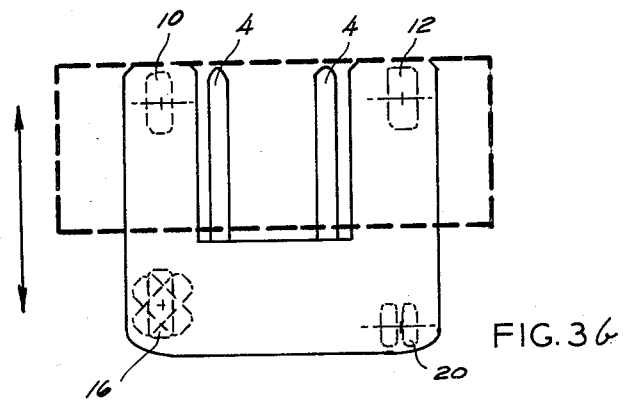
FIGS. 3a and 3b are plan views of the invention showing how the wheels are set for principally longitudinal (forward and reverse) and lateral (left and right) traveling, respectively.
Figure 3A:
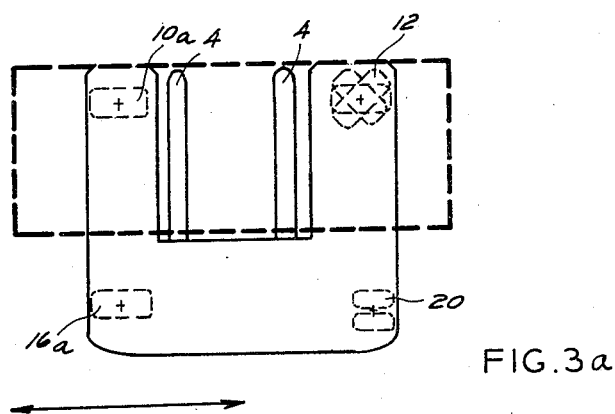

Wheel 16 is a powered, or driven, wheel provided with braking and hydraulic power steering. Wheel 16 also is provided with power positioning means which can position wheel 16 either to its longitudinal nominal position shown or to its lateral nominal position shown at 16a. After having been positioned to its longitudinal nominal position, wheel 16 may be steered in either direction from this position, and during principally longitudinal travel wheel 16 steers the truck as tiller 26 is adjusted. During principally longitudinal travel wheel 10 is, of course, positioned to its longitudinal direction as shown at 10 and wheel 12 is positioned as shown at 12. Tiller 26 steers the truck by controlling wheel 16, rotating wheel 16 in either direction, as may be desired, from the longitudinal nominal position shown at 16. The overall arrangement for principally longitudinal travel now should be apparent from FIG. 3a.

It is important to note that wheel 16 is located in exactly a longitudinal direction from wheel 10. Such location of wheel 16 with respect to wheel 10 serves to avoid complex steering geometry problems which otherwise would occur. Also, wheel 12 is located in exactly a lateral direction from wheel 10, for the same reason. Wheel 12 is a motor-driven wheel provided with braking and hydraulic power steering. Wheel 12 also is provided with power positioning means which can position wheel 12 to its longitudinal nominal position or to its lateral nominal position shown at 12a. After having been positioned to its lateral nominal position, wheel 12 may be steered in either direction from this position, and during principally lateral travel wheel 12 steers the truck; as tiller 25 is adjusted. During lateral travel wheels 10 and 16 remain locked in their lateral positions shown at 10a and 16a. The overall arrangement for principally lateral travel now should be apparent from FIG. 3b.

Figure 2:
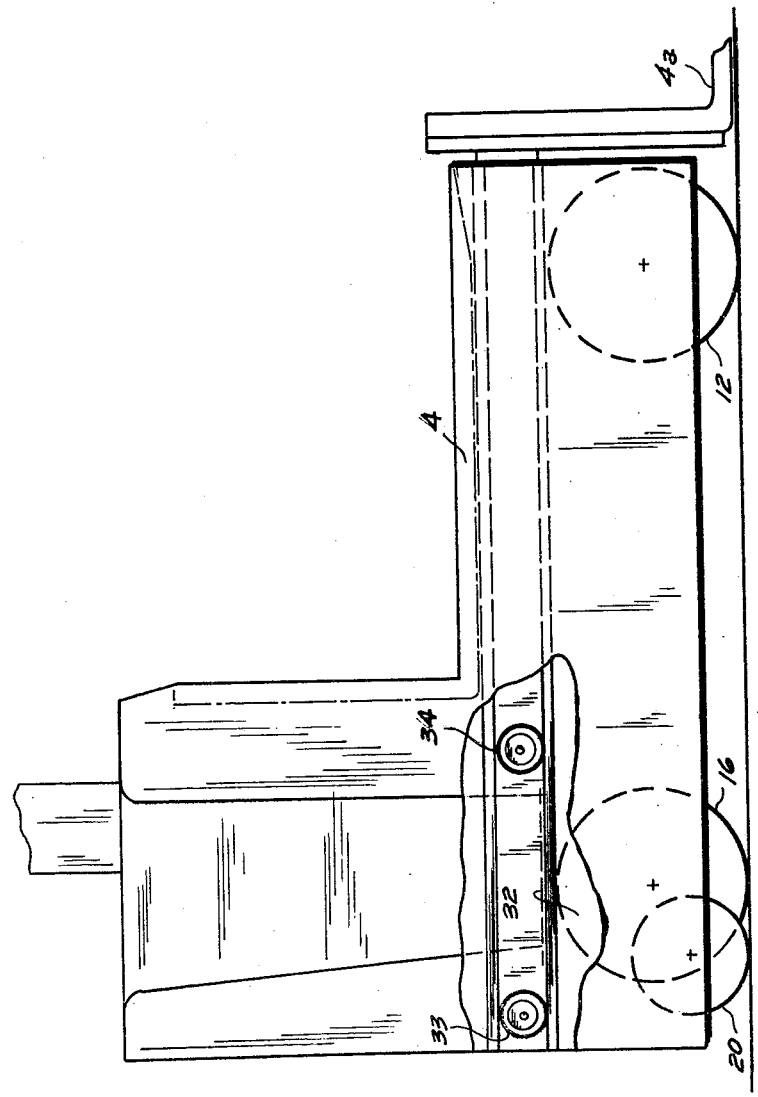
FIG. 2 is an elevation view of the truck of FIG. 1, with numerous parts not necessary for an understanding the invention not shown.

While maximum stability suggests that caster 20 be located near the fourth corner of the rectangle determined by the location of the other three wheels, it is not important that caster 20 be located exactly at such a location, and indeed as best seen in FIG. 2, caster 20 is shown located slightly to the rear of wheel 16. Being of lesser diameter, caster 20 may be so located without increasing the overall dimensions of the truck, while still increasing stability by being located at a greater distance from the center of gravity of the truck.

While caster 20 has been shown located under the operator's platform corner of the truck it could as well be located under a different corner, in fact under any corner.

The specific embodiment of the invention shown in FIG. 2 is designed to handle all long loads (i.e., longer than dimension D in FIG. 1) by first picking up the load, beginning with forks 4, 4 extended and fully lowered, as shown at 4a in FIG. 2, and first lifting the load above the height of the outriggers, or sides of the U-shaped frame, to at least the height of the forks shown at 4 in FIG. 2, and then retracting the forks, by retracting the mast and load carriage so that the weight of the load is centered fairly near the center of the truck. Loads less in width than dimension D may, of course, be retracted directly into the frame without first having to lift them to clear the outriggers.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. A material handling truck comprising in combination, a frame supported by four wheels; a first of said wheels comprising a free-swiveling caster; a second of said wheels comprising a motor-driven wheel capable of being turned in either direction from a nominal position defining a first direction to steer said truck in a first steering mode and capable of being locked in a second position perpendicular to said nominal position in a second steering mode; a third of said wheels comprising a wheel located in said first direction from said second wheel, said third wheel being capable of being locked in said first direction in said first steering mode and capable of being locked in said second direction perpendicular to said first direction in said second steering mode; a fourth of said wheels comprising a motor driven wheel located in said second direction from said third wheel, said fourth wheel being capable of being locked in said first direction in said first steering mode and capable of being turned in either direction from a nominal position perpendicular to said first direction in said second steering mode.

2. A material handling truck provided with two steering modes for travel in first and second mutually perpendicular directions, comprising in combination: a frame supported by four wheels spaced substantially in a rectangular pattern, each of said four wheels being pivotable about a respective vertical steering axis; a first of said wheels comprising a free-swiveling caster; a second of said wheels being located diagonally opposite said caster, and positionable to either one of said two mutually perpendicular directions; a third of said wheels being located so that its steering axis is located at a first distance in said second direction from the steering axis of said second wheel; a fourth of said wheels being located with its steering axis spaced at a second distance in said first direction from the steering axis of said second wheel; said third and fourth wheels being selectively steerable or locked in position in accordance with selection of one of said two steering modes.

3. A material handling truck comprising in combination: a frame supported by four wheels spaced substantially in a rectangular pattern; a first of said wheels comprising a free-swiveling caster; a second of said wheels comprising a motor-driven wheel positionable to either one of two discrete mutually perpendicular positions and continuously steerable in either direction from either of said two positions; a third of said wheels being positionable in directions corresponding to said two discrete mutually perpendicular positions of said second wheel; and a fourth of said wheels comprising a further motor-driven wheel, at least one of said wheels comprising a motor-wheel assembly having a motor and a gear reduction unit mounted concentrically with said motor.

4. Apparatus according to claim 1 in which said truck includes an operator's platform located over said free-swiveling caster.

5. Apparatus according to claim 1 in which said caster comprises a spring-articulated caster.

6. Apparatus according to claim 1 in which said second and fourth of said wheels are located at substantially equal distances from the center of the track.

7. Apparatus according to claim 1 in which said frame carries a retractable load-carrying member capable of elevating and lowering a load.

References Cited in the file of this patent

UNITED STATES PATENTS

| | | |
|---|---|---|
| 2,482,203 | Peterson | Sept. 20, 1949 |
| 2,564,002 | Gibson | Aug. 14, 1951 |
| 2,635,711 | Turner | Apr. 21, 1953 |
| 2,752,058 | Gibson | June 26, 1956 |
| 2,753,946 | Quayle | July 10, 1956 |
| 2,925,887 | Gibson | Feb. 23, 1960 |
| 2,973,878 | Gibson | Mar. 7, 1961 |
| 3,031,024 | Ulinski | Apr. 24, 1962 |